UNITED STATES PATENT OFFICE.

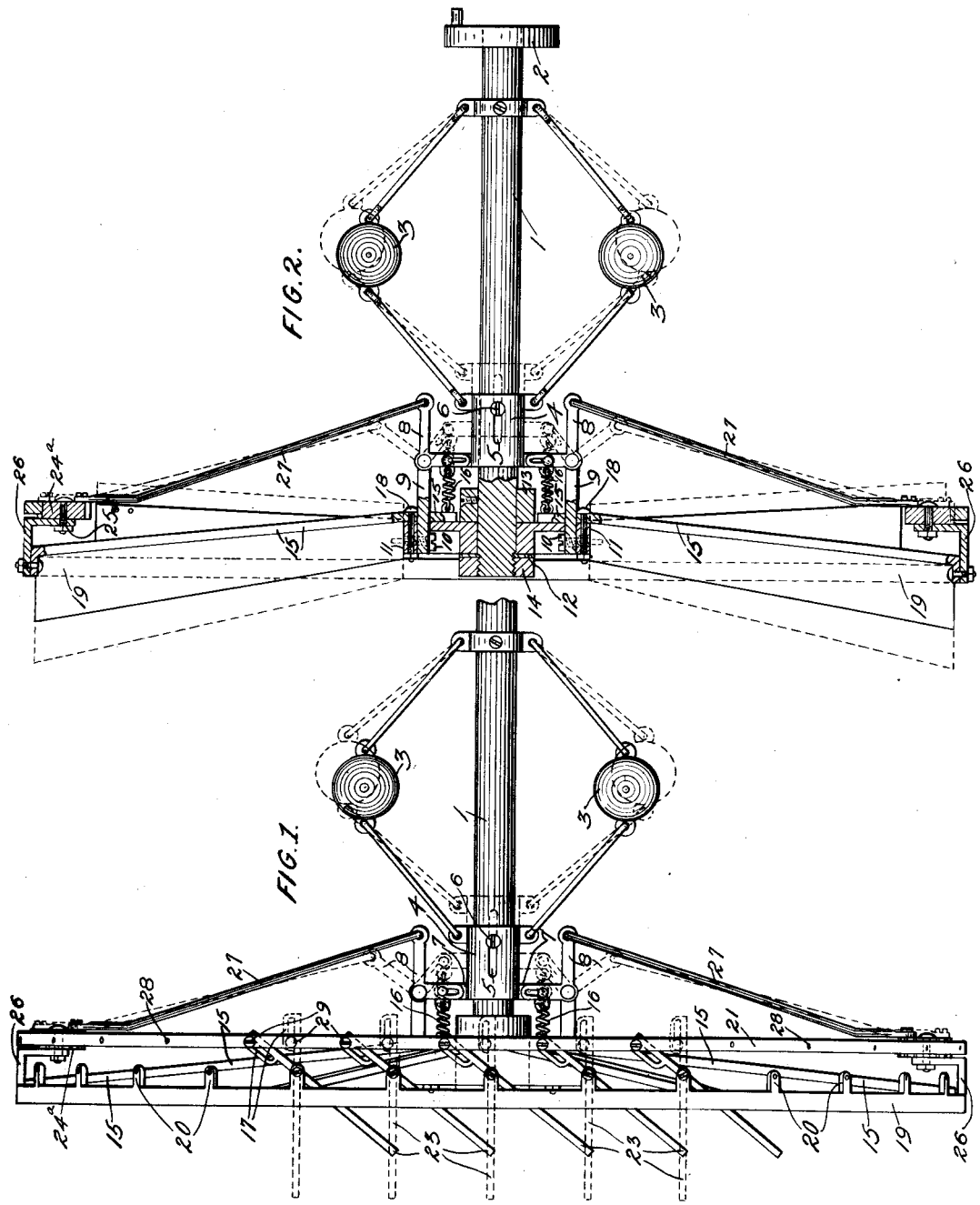

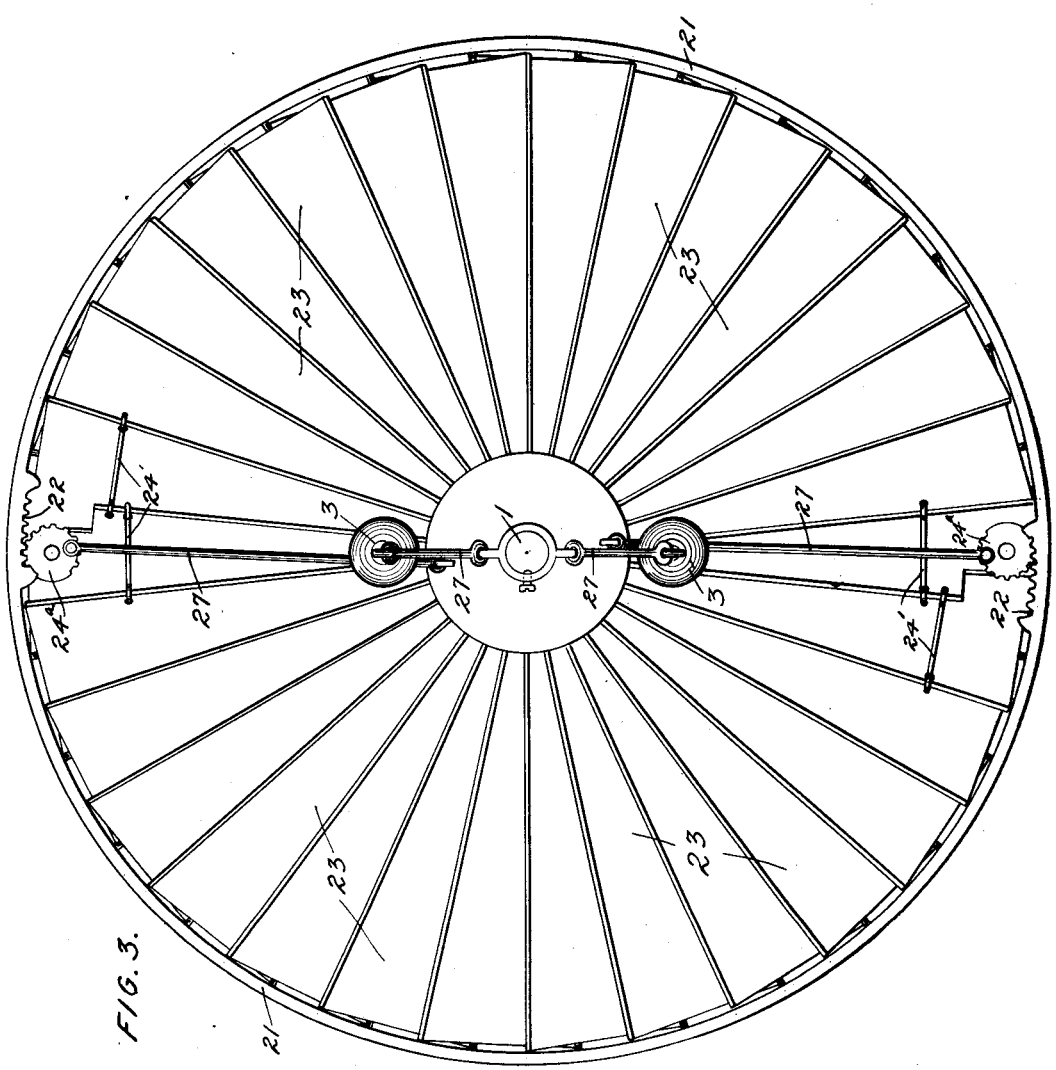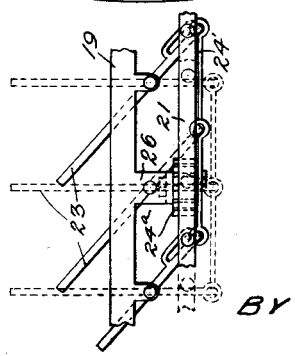

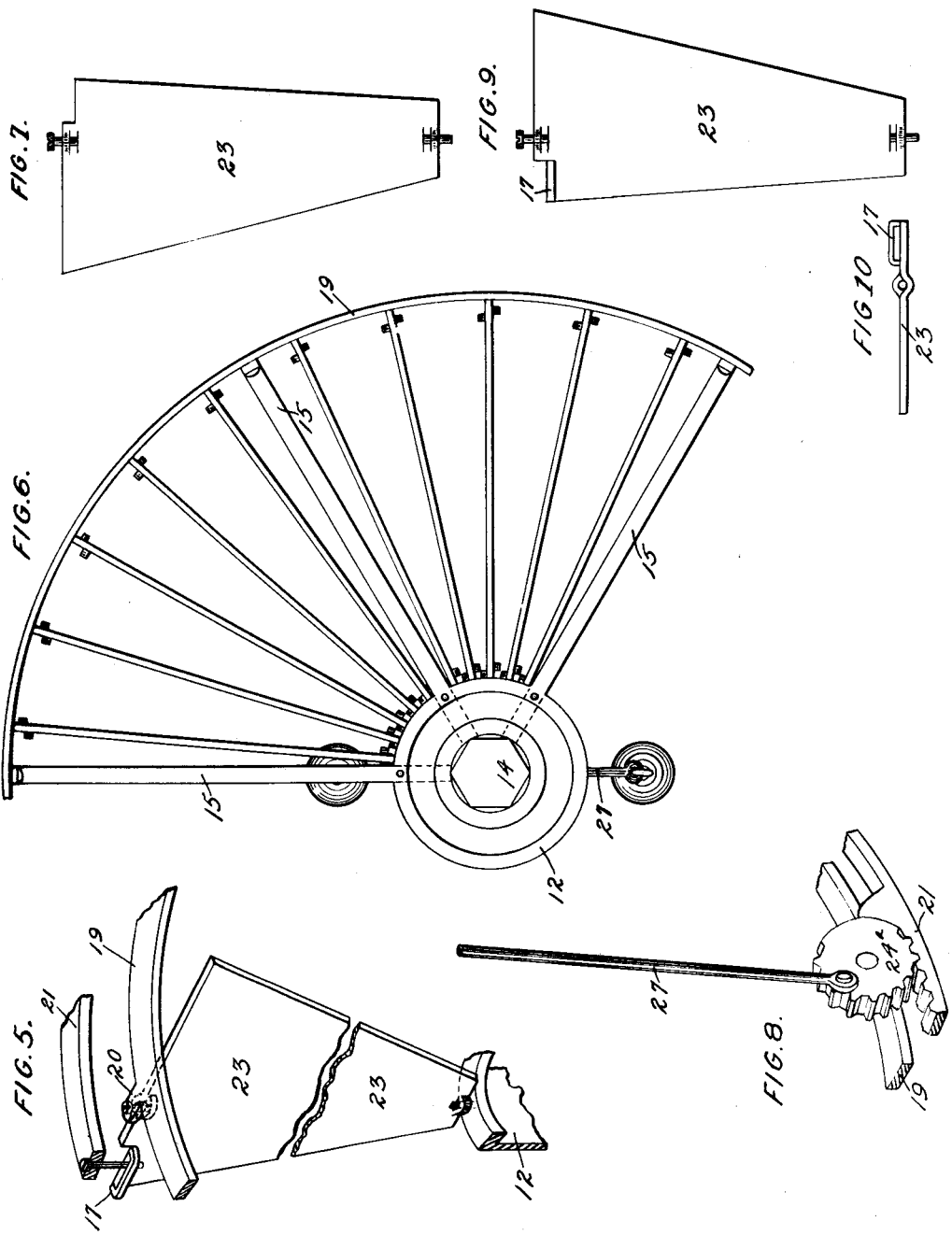

JONAS HAROLD ENGBERG, OF BRAHAM, MINNESOTA.

WIND-WHEEL.

1,066,803.  Specification of Letters Patent.  Patented July 8, 1913.

Application filed March 21, 1912, Serial No. 685,188. Renewed March 27, 1913. Serial No. 757,258.

*To all whom it may concern:*

Be it known that I, JONAS HAROLD ENGBERG, a citizen of the United States, residing at Braham, in the county of Kanabec, in the State of Minnesota, have invented certain new and useful Improvements in Wind-Wheels, of which the following is a specification.

This invention relates to improvements in wind wheels and its object is to provide a device of this class that will automatically regulate its speed in a wind of any velocity.

The invention consists in the combination and arrangement of parts to be fully described in the following specification, pointed out in the claims and illustrated in the accompanying drawings which form a part of the specification, and in which—

Figure 1 is a side elevation of my improved wind wheel and governor. Fig. 2 is a similar view partly in section. Fig. 3 is a rear plan of the device. Fig. 4 is a plan of a detail. Fig. 5 is a foreshortened perspective of one of the wings. Fig. 6 is a front plan of a portion of the wind wheel showing the wings in their inoperative position. Figs. 7 and 9 are views of opposite sides of a wing. Fig. 8 is a detail of the governor gear. Fig. 10 is a view of a portion of one wing on edge.

Like reference characters indicate corresponding parts throughout the several views.

1 is the shaft or axis upon which my wind wheel is supported and which likewise carries the pump rod eccentric 2, when the device is used as a wind pump, and the governor 3. The loose governor-keeper 4 is slotted as at 5 and a pin 6 affixed in the shaft 1 extends through the slot 5 and permits reciprocation of the keeper upon the shaft. The keeper 4 is provided with ears 7, 7 that are pin-connected to the slotted extremity of bell cranks 8, 8 the apex of each of which is pivoted to rods 9, 9 connected by pins 10, 10 to the inner periphery 11 of a hub 12 mounted upon the shaft 1; 13 is a collar secured to the shaft 1 upon the governor side of the hub and 14 is a nut secured upon the threaded extremity of the shaft 1 at the other side of the said hub. Upon the back of the hub 12 spokes 15, 15 are secured and to them one end of either spring 16, 16 is secured, the other end of the spring being fastened to a lug made integral with the ears 7 of the governor-keeper 4.

The several spokes in the wheel extend from the hub 12 to which they are secured by bolts 18 outwardly to a front wheel rim 19 which is provided with a plurality of integral back-projecting apertured lugs 20 and between the front wheel rim and the hub 12 a plurality of wings 23 are supported upon suitable pivots as shown in Fig. 5. 21 is a rear wheel rim formed with a pair of oppositely disposed racks 22, 22 upon its inner periphery. The width of each wing 23 increases as it extends from the hub 12 to the rim 19 and at this rim one corner of each wing is offset and provided with a metallic loop 17 disposed in a plane at right angles to the body of the wing. Two of the wings 23 disposed opposite each other are not pivotally connected to the rim 19 but are each connected by links 24', 24' to the two adjacent wings 23 and by them operated. This construction is necessary to permit the operation of the two one-pivot wings just described past gear wheels 24ª, 24ª the axes 25, 25 of which are secured to angle pieces 26, 26 to which pieces the outward terminations of the several spokes 15 are also secured. Arms 27, 27 have one end secured to the face of one gear wheel 24ª near its outer edge, the other end of the said arms being secured to the upper termination of the bell cranks 8, 8.

The outer periphery of the rear wheel rim 21 is provided with a plurality of apertures 28 through which pins 29 extend for engagement with the loops 17 of the wings 23.

Operation: The rotation or operation of the entire wind wheel is caused by the wind blowing against the face of the device when the wings overlap as shown in Fig. 3. When a gale of wind causes the device to rotate at a dangerous speed or at such a speed as to cause danger of breakage of its parts the governor 3 will assume the position shown in dotted lines which will draw the keeper 4 back toward the governor against the tension of the springs 16, 16 thus rotating the bell cranks into the position shown dotted which will cause the arms 27, 27 to so actuate the gear wheels 24ª, 24ª as to force the rear wheel rim 21 to rotate sufficiently to throw the said wheels 24ª to the opposite end of the rack 22. This movement of the rim 21 is in a plane parallel with the plane of the rim 19 and is independent of that rim and the result of this movement is to oscillate the wings 23 upon their pivots until they assume the position shown in Fig. 6 when they cease to overlap each other and the violent air currents may blow harmlessly through them with the result that the speed of the wheel will slacken (since the propelling force has been withdrawn or greatly reduced) and as the speed becomes normal the springs 16, 16 will draw the governor back into its normal position, shown in full lines, when the other parts of the device will assume their normal positions.

What is claimed is:—

1. In a mechanism of the class described the combination with a revoluble shaft provided with a governor having one movable keeper, of a hub mounted on said shaft, rods carried by said hub, bell cranks pivotally secured to said rods and operatively connected to the said governor keeper, spokes secured to said hub, angle pieces terminally carried by said spokes, oppositely disposed gears pivotally carried by oppositely disposed angle pieces, arms connecting the said gears and the aforesaid bell cranks, a rear wheel rim formed with oppositely disposed interior racks for engagement with the said gears, a front wheel rim formed with integral lugs, wings, formed with loops, pivotally connecting the said front wheel rim and the aforesaid hub, pins carried by said rear wheel rim engaging the looped portions of the said wings and means connecting the said governor keeper and the said spokes for returning the mechanism to normal position after that position has been disturbed.

2. In a mechanism of the class described the combination with a revoluble shaft provided with a governor having one movable keeper, of a hub mounted on said shaft, a nut terminally carried by said shaft, rods carried by said hub, bell cranks pivotally secured to the said rods and operatively connected to the said governor keeper, spokes secured to said hub, angle pieces terminally carried by said spokes, oppositely disposed gears pivotally carried by two of the said angle pieces, arms connecting the said gears and the aforesaid bell cranks, a rear wheel rim formed with oppositely disposed interior racks for engagement with the said gears, a front wheel rim formed with integral lugs, wings, formed with loops, pivotally connecting the front rim and the aforesaid hub, pins carried by said rear wheel rim engaging the looped portions of the said wings and a spring connecting the said governor keeper and spokes.

3. In a mechanism of the class described the combination with a revoluble shaft provided with a governor having one movable keeper, of a hub mounted on said shaft, a nut terminally carried by said shaft, rods carried by said hub, bell cranks pivotally secured to said rod and operatively connected to the said governor keeper, spokes secured to said hub, angle pieces terminally carried by said spokes, oppositely disposed gears pivotally carried by two of the said angle pieces, arms connecting the said gears and the aforesaid bell cranks, a rear wheel rim formed with oppositely disposed interior racks for engagement with the said gears, a front wheel rim formed with integral lugs, wings connecting the front and rear rims and the hub whereby one of the said rims is movable independently of the other and a spring connecting the said governor keeper and spokes.

In testimony that I claim the foregoing as my own I have hereto affixed my signature in the presence of two subscribing witnesses.

JONAS HAROLD ENGBERG.

Witnesses:
FRED C. FALK,
JNO. WM. RUNQUIST.